(12) United States Patent
Uchiyama et al.

(10) Patent No.: US 10,698,136 B2
(45) Date of Patent: Jun. 30, 2020

(54) OPTICAL MEMBER AND METHOD FOR MANUFACTURING THE SAME

(71) Applicant: Panasonic Intellectual Property Management Co., Ltd., Osaka (JP)

(72) Inventors: Hirokazu Uchiyama, Osaka (JP); Tomokiyo Yamada, Osaka (JP); Hiroshi Adachi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 376 days.

(21) Appl. No.: 15/460,428

(22) Filed: Mar. 16, 2017

(65) Prior Publication Data

US 2018/0024275 A1   Jan. 25, 2018

(30) Foreign Application Priority Data

Jul. 19, 2016 (JP) ................................. 2016-141442
Dec. 12, 2016 (JP) ................................. 2016-239975

(51) Int. Cl.
*G02B 1/111* (2015.01)
*C03C 17/00* (2006.01)

(52) U.S. Cl.
CPC ............ *G02B 1/111* (2013.01); *C03C 17/007* (2013.01); *C03C 2217/425* (2013.01); *C03C 2217/445* (2013.01); *C03C 2217/478* (2013.01); *C03C 2217/48* (2013.01); *C03C 2218/32* (2013.01); *G02B 2207/107* (2013.01)

(58) Field of Classification Search
CPC ............ C03C 17/007; C03C 2217/425; C03C 2217/445; C03C 2217/478; C03C 2217/48; C03C 2218/32; G02B 1/111; G02B 2207/107
See application file for complete search history.

(56) References Cited

U.S. PATENT DOCUMENTS

| | | | |
|---|---|---|---|
| 2012/0164413 A1 | 6/2012 | Hara et al. | |
| 2013/0157026 A1* | 6/2013 | Kotani | .................. C03C 3/091 428/215 |
| 2013/0273317 A1* | 10/2013 | Nakayama | ............... G02B 1/11 428/141 |
| 2015/0004398 A1 | 1/2015 | Yabuta et al. | |
| 2015/0316691 A1* | 11/2015 | Nakayama | ............ C09D 133/24 428/148 |
| 2015/0362634 A1 | 12/2015 | Iwase et al. | |

FOREIGN PATENT DOCUMENTS

| | | |
|---|---|---|
| JP | 7-104103 A | 4/1995 |
| JP | 2011-068122 A | 4/2011 |
| JP | 2013-158683 | 8/2013 |
| WO | 2014/162374 A1 | 10/2014 |

* cited by examiner

*Primary Examiner* — Latosha Hines
(74) *Attorney, Agent, or Firm* — Wenderoth, Lind & Ponack, L.L.P.

(57) ABSTRACT

An optical member includes a substrate and a thin film that is disposed on the substrate and contains inorganic particles and a resin. The resin has a volume occupancy of less than 5% in a region up to at least 60 nm in depth from a surface of at least a part of the thin film, the surface being opposite from a substrate-end surface of the thin film.

6 Claims, 7 Drawing Sheets

OPTICAL MEMBER AND METHOD FOR MANUFACTURING THE SAME

BACKGROUND

1. Technical Field

The present disclosure relates to an optical member that includes a thin film containing inorganic particles and a resin, and a method for manufacturing the optical member.

2. Description of Related Art

Unexamined Japanese Patent Publication No. 2013-158683 discloses a glass article including a photocatalyst film. The photocatalyst film contains silicon oxide particles in an amount ranging from 72 mass % to 79 mass %, titanium oxide particles in an amount ranging from 13 mass % to 18 mass %, and a binder component in an amount ranging from 8 mass % to 14 mass %, relative to a total amount of the silicon oxide particles, the titanium oxide particles, and the binder component. An average particle diameter of the silicon oxide particles ranges from 30 nm to 200 nm, an average particle diameter of the titanium oxide particles ranges from 5 nm to 20 nm, and an average particle diameter of the silicon oxide particles is 5 times or more the average particle diameter of the titanium oxide particles. With film thickness of the photocatalyst film as T, 80% or more of the titanium oxide particles are localized in a range from a surface of a glass sheet to 0.6 T.

SUMMARY

An optical member of the present disclosure includes a substrate and a thin film disposed on the substrate. The thin film contains inorganic particles and a resin. The resin has a volume occupancy of less than 5% in a region up at least 60 nm in depth from a surface of at least a part of the thin film, the surface being opposite from a substrate-end surface of the thin film.

A method for manufacturing an optical member of the present disclosure includes a thin film forming step and an etching step. In the thin film forming step, a thin film containing inorganic particles and a resin is formed on a substrate. In the etching step, the etching is performed on at least a part of the thin film such that the resin has a volume occupancy of less than 5% in a region up to at least 60 nm in depth from a surface of the part of the thin film, the surface being opposite from a substrate-end surface of the thin film.

According to the present disclosure, there can be provided an optical member on a surface of which reflection is suppressed, and a method for manufacturing the optical member.

DETAILED DESCRIPTION

Hereinafter, exemplary embodiments are described in detail with appropriate reference to drawings. Detailed description more than necessary, however, is omitted in some cases. For example, there are some cases of omission of detailed description for a matter that has already been known or overlapping description for a substantially identical configuration. This is to avoid the following description from being unnecessarily redundant for easy understanding of those skilled in the art.

The attached drawings and the following description are provided for helping those skilled in the art sufficiently understand the present disclosure, and it is not intended to limit subject matters described in claims by these drawings and description.

FIRST EXEMPLARY EMBODIMENT 1-1. Outline

As an optical member, there can be exemplified a camera lens. In a first exemplary embodiment, a coating (thin film) is formed on a surface of a lens. This thin film can suppress light reflection.

1-2. Configuration

Figure 1:
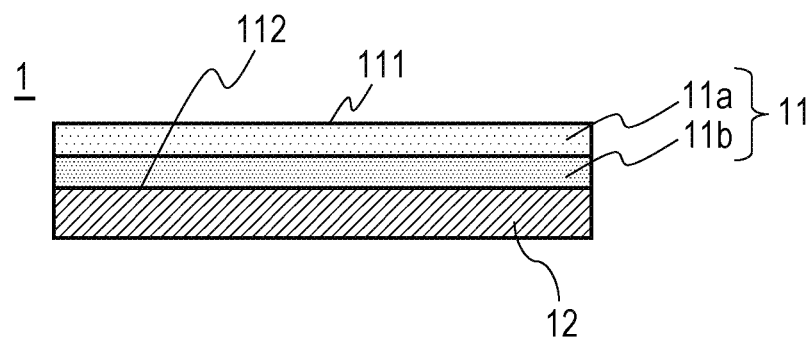
FIG. 1 is a schematic view showing a sectional structure of an optical member according to a first exemplary embodiment.

FIG. 1 is a schematic view showing a sectional structure of optical member 1 according to the first exemplary embodiment. As shown in FIG. 1, optical member 1 in the first exemplary embodiment includes substrate 12 and thin film 11 formed on substrate 12.

Substrate 12 is, for example, a lens. A surface of substrate 12 on which thin film 11 is formed is referred to as surface 112. A material that constitutes substrate 12 is not particularly limited, and examples of the material include a resin, glass, a metal, and ceramics. Examples of the resin include a polycarbonate material and an acrylic material.

Thin film 11 is a film containing inorganic particles and a resin. Surface 111 of thin film 11 is a surface opposite to a surface facing surface 112 of substrate 12. Surface 111 constitutes an outer surface of optical member 1.

Thin film 11 includes front surface layer (first layer) 11a and inner surface layer (second layer) 11b.

Front surface layer 11a indicates a region of thin film 11 from surface 111 to a depth of at least 60 nm. That is, thickness of front surface layer 11a, i.e., thickness in a direction orthogonal to surface 112 is 60 nm or more. Optimal thickness of front surface layer 11a ranges from 80 nm to 200 nm (both inclusive). This thickness can be calculated from a material of thin film 11 or a wavelength of light whose reflection is desired to be suppressed.

A volume occupancy of the inorganic particles in front surface layer 11a of thin film 11 ranges from 10% to 50% (both inclusive). A volume occupancy of the resin in front surface layer 11a is less than 5%. A residual except the inorganic particles and the resin in front surface layer 11a of thin film 11 is referred to as a residual portion. This residual portion is occupied by air (holes) in an amount ranging from 45 vol % to 85 vol % (both inclusive). Herein, volume of front surface layer 11a refers to volume calculated by a product of area of surface 112 on which thin film 11 including front surface layer 11a is formed and the thickness of front surface layer 11a. Accordingly, the volume occupancy in front surface layer 11a means a percentage of occupancy in the volume of front surface layer 11a. The volume occupancy of the inorganic particles and the resin can be calculated by, for example, an image analysis method with use of a scanning electron microscope (SEM) or a transmission electron microscope (TEM).

Inner surface layer 11b of thin film 11 is disposed between substrate 12 and front surface layer 11a. Inner surface layer 11b is in contact with surface 112 of substrate 12. Thickness of inner surface layer 11b is 10 nm or more. An upper limit of the thickness of inner surface layer 11b is not particularly limited. The volume occupancy of the inorganic particles in inner surface layer 11b ranges from 10% to 50% (both inclusive). The volume occupancy of the resin in inner surface layer 11b is different from the volume occupancy of the resin in front surface layer 11a. The volume occupancy of the resin in inner surface layer 11b is larger than the volume occupancy of the resin in front surface layer 11a. The volume occupancy of the resin in inner surface layer 11b ranges from 40% to 90% (both inclusive). A residual except the inorganic particles and the resin in inner surface layer 11b is referred to as a residual portion. This residual portion is occupied by air (holes). A volume occupancy of air in inner surface layer 11b is equal to or less than the volume occupancy of air in front surface layer 11a. Herein, volume of inner surface layer 11b is calculated by a product of the area of surface 112 on which thin film 11 including inner surface layer 11b is formed and the thickness of inner surface layer 11b. The volume occupancy in inner surface layer 11b means a percentage of occupancy in the volume of inner surface layer 11b.

A material for the inorganic particles contained in thin film 11 is, for example, silicon oxide, and particularly, amorphous silicon dioxide is preferable. Other examples of the material include aluminum oxide, niobium oxide, zirconium oxide, and titanium oxide. An average particle diameter of the inorganic particles should range from 20 nm to 30 nm (both inclusive).

Examples of a material for the resin contained in thin film 11 include an acrylic material, cellulose, and epoxy.

1-3. Manufacturing Method

Figure 2A:
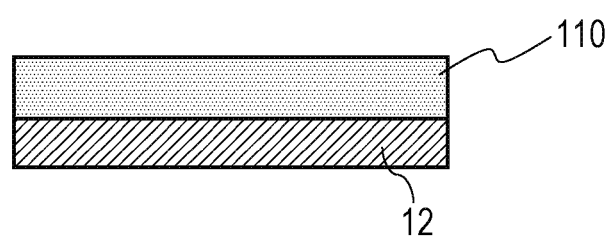
FIG. 2A is a schematic view showing a manufacturing process of the optical member according to the first exemplary embodiment.
Figure 2B:
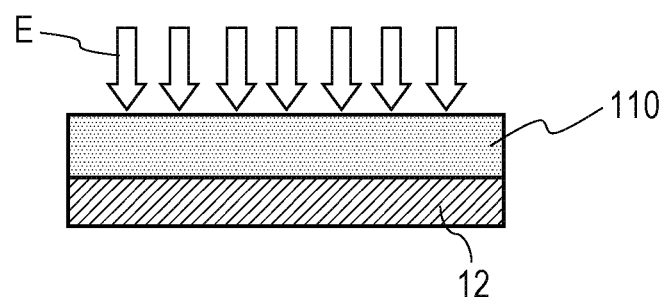
FIG. 2B is a schematic view showing the manufacturing process of the optical member according to the first exemplary embodiment.
Figure 2C:
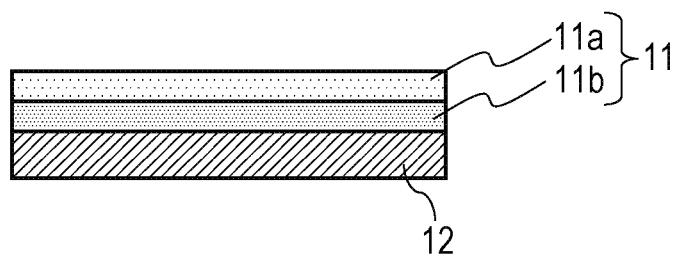
FIG. 2C is a schematic view showing the manufacturing process of the optical member according to the first exemplary embodiment.

FIGS. 2A to 2C are schematic views showing a manufacturing process of optical member 1 according to the first exemplary embodiment. The manufacturing process proceeds in an order of FIGS. 2A, 2B, and 2C.

FIG. 2A is a schematic view showing a state after thin film 110, which is to be thin film 11 after etching, is formed on substrate 12.

Thin film 110 can be formed by using, for example, a general surface modifier. As the surface modifier, there can be used, for example, a commercially available colloidal silica material, hard coating material, or undercoating material. Examples of a material suitable for the surface modifier include a polymer material containing silicon dioxide particles at a volume occupancy ranging from 1% to 30% (both inclusive). This volume occupancy is a value before curing.

Thin film 110 may be formed by various film forming methods such as spraying, dipping, spin coating, and flow coating. In addition, thin film 110 may be formed by forming a film-like membrane by, for example, printing, and transferring this membrane (thin film 110) onto substrate 12.

FIG. 2B is a schematic view showing a state of performing etching E on a surface of thin film 110. A method for the etching E may be dry etching methods such as electric discharge machining and a plasma process, or a wet etching method using a liquid.

FIG. 2C is a schematic view showing optical member 1 according to the first exemplary embodiment that has been manufactured through the steps shown in FIGS. 2A and 2B.

As shown in FIG. 2C, thin film 110 on substrate 12 becomes thin film 11 by the etching E. Thin film 11 includes front surface layer 11a constituting an outer surface of optical member 1 and inner surface layer 11b positioned between front surface layer 11a and substrate 12. That is, thin film 11 differs in composition according to depth from surface 111 by the etching E in FIG. 2B. Accordingly, thin film 11 can be considered to be a two-layer structure of front surface layer 11a and inner surface layer 11b. In a boundary between front surface layer 11a and inner surface layer 11b, the composition of thin film 11 may gradually change. Depth of front surface layer 11a can be adjusted according to an etching E period.

Figure 3:
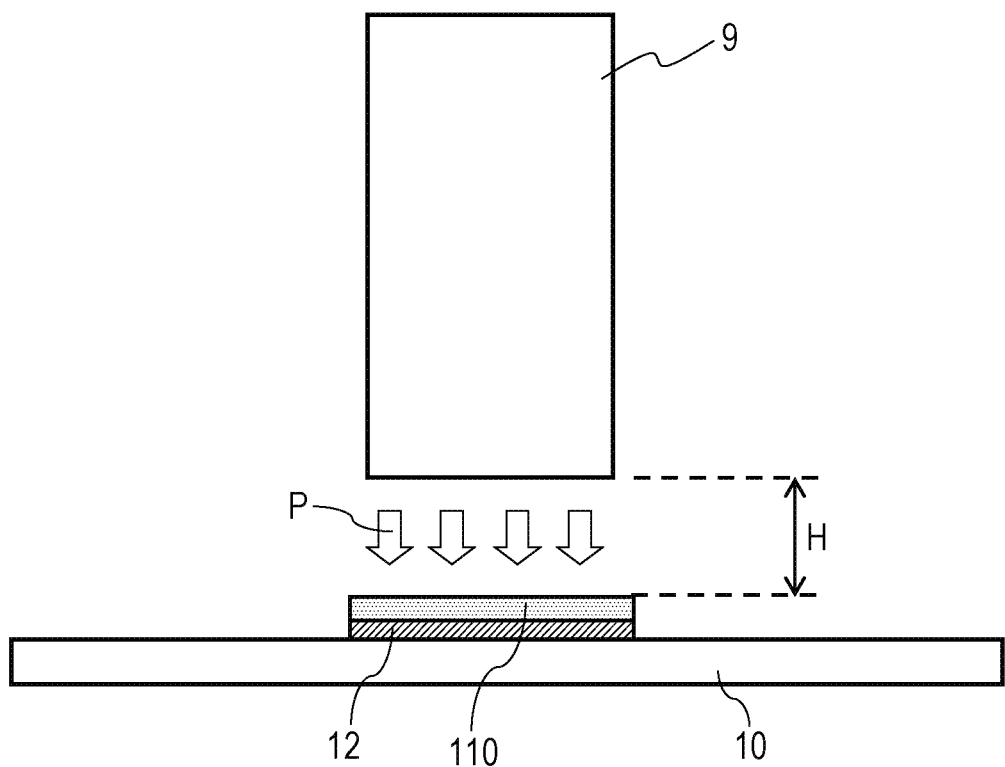
FIG. 3 is a schematic view showing a state of performing plasma etching viewed from a side.
Figure 4:
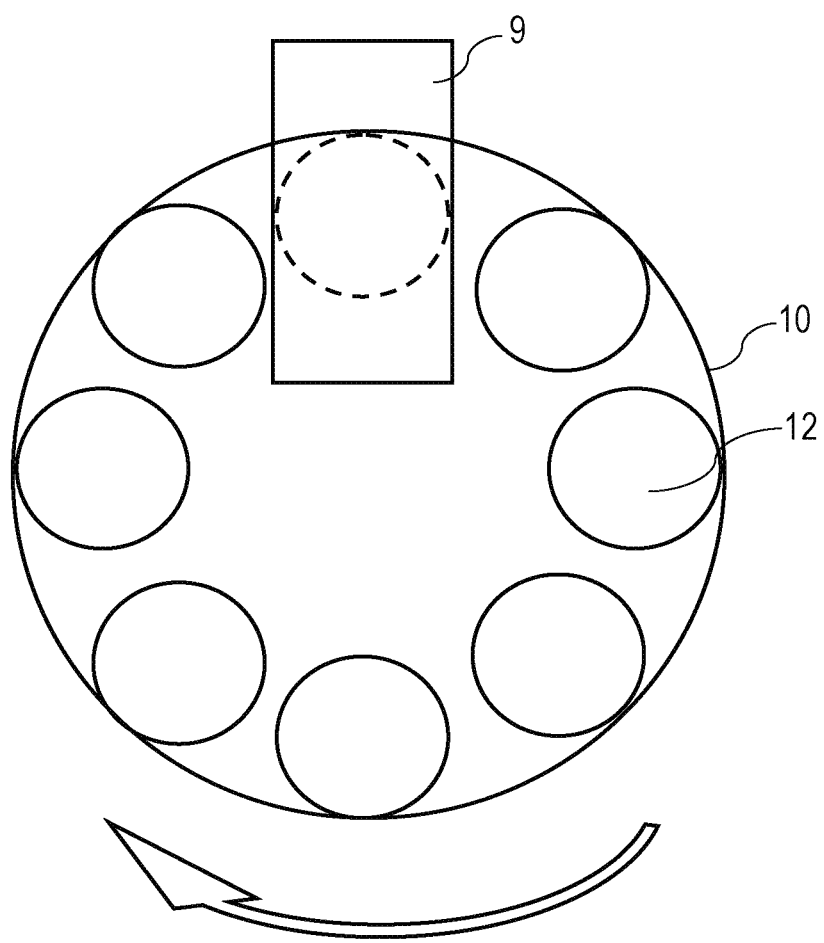
FIG. 4 is a schematic view showing a state of performing plasma etching viewed from above.

FIGS. 3 and 4 are views schematically showing a state of performing plasma etching E as the etching E shown in FIG. 2B. FIG. 3 is a schematic view viewed from a side. FIG. 4 is a schematic view viewed from above.

As shown in FIG. 3, substrate 12 is disposed on stage 10. Above stage 10 is disposed an extraction port of plasma discharge P in plasma gun head 9 of an atmospheric plasma device. Distance H between the extraction port and substrate 12 is preferably 10 mm or less, more preferably 3 mm or less. With an etching gas introduced in a state in which plasma is discharged from the extraction port, thin film 11 formed on substrate 12 is etched (dry-etched) as shown in FIG. 2B to give a structure shown in FIG. 2C.

As shown in FIG. 4, stage 10 may be rotary stage 10. Substrate 12 is mounted on stage 10, and dry etching may be performed while stage 10 is rotated at an appropriate rotating speed of, for example, 180 revolutions per minute. Such a method enables more uniform etching E.

1-4. Effects

In the first exemplary embodiment, the resin has the volume occupancy of less than 5% in the region up to at least 60 nm in depth from surface 111 of at least the part of thin film 11, the region corresponding to front surface layer 11a.

This front surface layer 11a can suppress reflection of incident light on optical member 1.

With inner surface layer 11b disposed between front surface layer 11a and substrate 12, a function other than the suppression of light reflection can be provided as a whole of thin film 11. For example, the volume occupancy of the resin in inner surface layer 11b ranges from 40% to 90% (both inclusive). With such a range, adhesion between substrate 12 and thin film 11 can be increased.

Further, with thin film 11 containing the inorganic particles, hardness of entire optical member 1 can be improved in the first exemplary embodiment.

The average particle diameter of the inorganic particles ranges from 20 nm to 30 nm (both inclusive) in the first exemplary embodiment. With such a range, a desired amount of the inorganic particles can be incorporated into an inside of thin film 11. Further, thin film 11 can easily be formed.

SECOND EXEMPLARY EMBODIMENT 2-1. Structure

Figure 5:
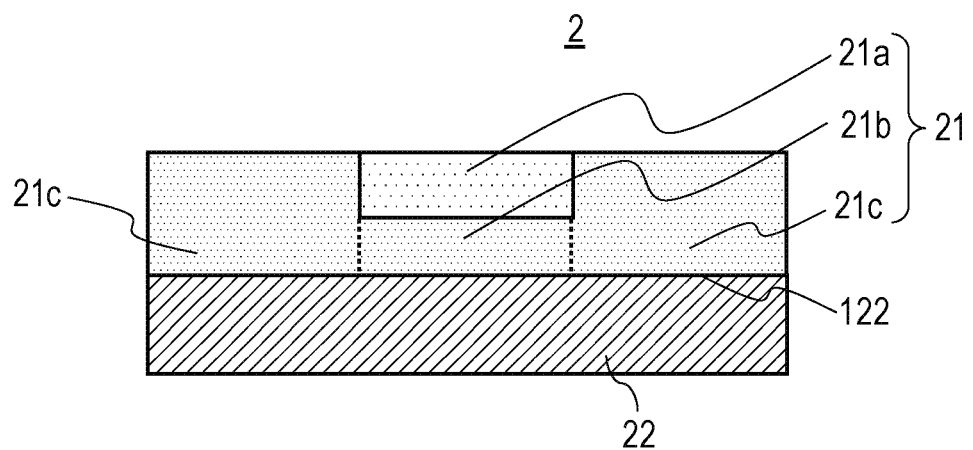
FIG. 5 is a schematic view showing a sectional structure of an optical member according to a second exemplary embodiment.

FIG. 5 is a schematic view showing a sectional structure of optical member 2 according to a second exemplary embodiment. As shown in FIG. 5, optical member 2 in the second exemplary embodiment includes substrate 22 and thin film 21 formed on surface 122 of substrate 22.

Substrate 22 is, for example, a lens. A surface of substrate 22 on which thin film 21 is formed is referred to as surface 122. A material that constitutes substrate 22 is not particularly limited, and examples of the material include a resin, glass, a metal, and ceramics. Examples of the resin include a polycarbonate material and an acrylic material.

Thin film 21 is a film containing inorganic particles and a resin. Thin film 21 includes first layer 21a, second layer 21b, and third layer 21c. First layer 21a is a front surface layer of thin film 21 and constitutes a part of an outer surface of optical member 2. Second layer 21b is an inner surface layer of the thin film and is positioned between first layer 21a and substrate 22. Third layer 21c is the other part of thin film 21 except first layer 21a and second layer 21b. That is, a part of thin film 21 in the second exemplary embodiment is a two-layer structure having first layer 21a and second layer 21b, and a remaining part of thin film 21 is a single-layer structure formed only of third layer 21c. In the second exemplary embodiment, a boundary between second layer 21b and third layer 21c is indicated by a dotted line, and second layer 21b and third layer 21c are described with different numerical references assigned to the second layer and the third layer, in FIG. 5, for convenience of description. Actually, however, second layer 21b and third layer 21c are integrated.

Thickness of first layer 21a of thin film 21 is 60 nm or more. Optimal thickness of first layer 21a ranges from 80 nm to 200 nm (both inclusive). A volume occupancy of the inorganic particles in first layer 21a ranges from 10% to 50% (both inclusive). A volume occupancy of the resin in first layer 21a is less than 5%. A residual portion except the inorganic particles and the resin of first layer 21a is occupied by air (holes) in an amount ranging from 45 vol % to 85 vol % (both inclusive). Herein, volume of first layer 21a refers to volume calculated by a product of area of surface 122 of substrate 22 on which thin film 21 including first layer 21a is formed and the thickness of first layer 21a. Accordingly, the volume occupancy in first layer 21a means a percentage of occupancy in the volume of first layer 21a. The volume occupancy of the inorganic particles and the resin can be calculated by, for example, an image analysis method with use of a scanning electron microscope (SEM) or a transmission electron microscope (TEM).

Thickness of second layer 21b of thin film 21 is 10 nm or more. An upper limit of the thickness of second layer 21b is not particularly limited.

The volume occupancy of the inorganic particles in second layer 21b of thin film 21 ranges from 10% to 50% (both inclusive). The volume occupancy of the resin in second layer 21b is different from the volume occupancy of the resin in first layer 21a. The volume occupancy of the resin in second layer 21b is larger than the volume occupancy of the resin in first layer 21a. The volume occupancy of the resin in second layer 21b ranges from 40% to 90% (both inclusive). A residual except the inorganic particles and the resin in second layer 21b is referred to as a residual portion. This residual portion is occupied by air (holes). Herein, volume of second layer 21b is calculated by a product of the area of surface 122 of substrate 22 on which second layer 21b is formed and the thickness of the second layer. Accordingly, the volume occupancy in second layer 21b means a percentage of occupancy in the volume of second layer 21b.

Thickness of third layer 21c of thin film 21 is a sum of the thicknesses of first layer 21a and second layer 21b. Composition of third layer 21c is almost the same as composition of second layer 21b.

A material for the inorganic particles contained in thin film 21 is, for example, silicon oxide, and particularly, amorphous silicon dioxide is preferable. Other examples of the material include aluminum oxide, niobium oxide, zirconium oxide, and titanium oxide. An average particle diameter of the inorganic particles should range from 20 nm to 30 nm (both inclusive).

Examples of a material for the resin contained in thin film 21 include an acrylic material, cellulose, and epoxy.

2-2. Manufacturing Method

FIGS. 6A to 6D are schematic views showing a manufacturing process of optical member 2 according to the second exemplary embodiment. The manufacturing process proceeds in an order of FIGS. 6A, 6B, 6C, and 6D.

Figure 6A:
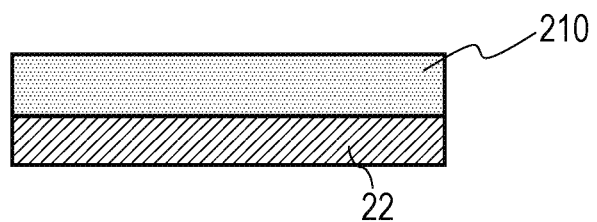
FIG. 6A is a schematic view showing a manufacturing process of the optical member according to the second exemplary embodiment.

FIG. 6A is a schematic view showing a state after thin film 210 to be subjected to etching E is formed on substrate 22.

Thin film 210 is formed by using, for example, a general surface modifier. As the surface modifier, there can be used, for example, a commercially available colloidal silica material, hard coating material, or undercoating material. Examples of a material suitable for the surface modifier include a polymer material containing silicon dioxide particles in a volume content ranging from 1% to 30% (both inclusive).

Thin film 210 may be formed by various film forming methods such as spraying, dipping, spin coating, and flow coating. In addition, thin film 210 may be formed by forming a film-like membrane (thin film 210) by, for example, printing, and transferring this membrane (thin film 210) onto substrate 22.

Figure 6B:
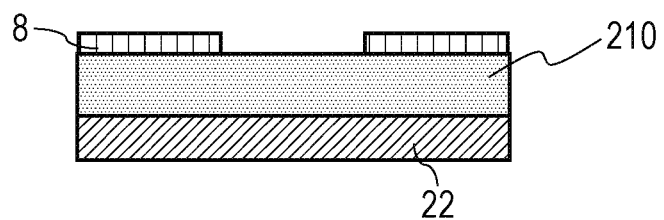
FIG. 6B is a schematic view showing the manufacturing process of the optical member according to the second exemplary embodiment.

FIG. 6B is a schematic view showing a state in which shielding plate 8 is mounted on thin film 210. Shielding plate 8 is mounted on a region of a surface of thin film 210 that is not subjected to the etching E to shield the region from the etching E. Examples of a material for shielding plate 8 include, in addition to a resist material used for a semiconductor process, insulating materials such as a polyimide material, ceramics, resins, and rubber.

Figure 6C:
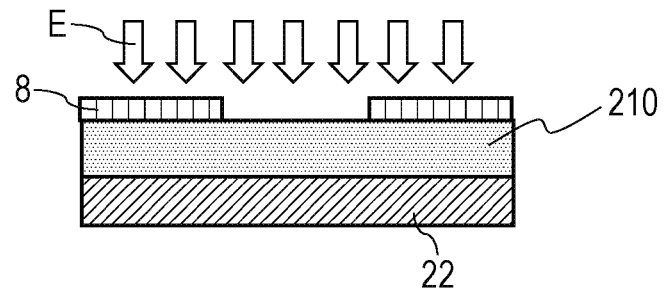
FIG. 6C is a schematic view showing the manufacturing process of the optical member according to the second exemplary embodiment.

FIG. 6C is a schematic view showing a state of performing the etching E on a surface of thin film 210. A method for the etching E may be dry etching methods such as electric discharge machining and a plasma process, or a wet etching method using a liquid. The etching E is performed on a region which is a part of thin film 210 and on a surface of which shielding plate 8 is not mounted. The etching E is not performed on a region which is the other part of thin film 210 and on a surface of which shielding plate 8 is mounted (a region corresponding to third layer 21c).

Figure 6D:
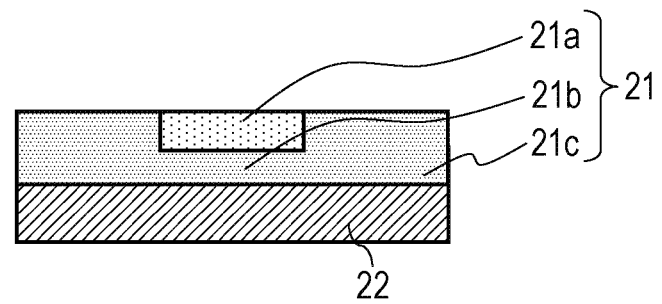
FIG. 6D is a schematic view showing the manufacturing process of the optical member according to the second exemplary embodiment.

FIG. 6D is a schematic view showing optical member 2 according to the second exemplary embodiment that has been manufactured through the steps shown in FIGS. 6A to 6C. As shown in FIG. 6D, thin film 210 in FIG. 6C becomes thin film 21 by the etching E. That is, in the second exemplary embodiment, a part of thin film 21 on the surface of which shielding plate 8 has not been mounted differs in composition according to depth from the surface, by the etching E in FIG. 6C. Accordingly, the structure of this part can be considered to be a two-layer structure of first layer 21a and second layer 21b. In a boundary between first layer 21a and second layer 21b, composition of thin film 21 may gradually change. On the other hand, composition of the other part of thin film 21 on the surface of which shielding plate 8 has been mounted does not change between before and after the etching E. Accordingly, the other part is formed only of third layer 21c.

For the etching in the manufacturing process of optical member 2 according to the second exemplary embodiment, a plasma process as shown in FIGS. 3 and 4 can be performed.

2-3. Effects

First layer 21a can suppress reflection of incident light on optical member 2 in the second exemplary embodiment.

With second layer 21b and third layer 21c provided, a function other than the suppression of light reflection can be provided as a whole of thin film 21. For example, the volume occupancy of the resin in third layer 21c ranges from 40% to 90% (both inclusive). With such a range, adhesion between substrate 22 and thin film 21 can be increased.

The exemplary embodiments described above are for exemplifying a technique in the present disclosure, and therefore, various modifications, replacements, additions, and omissions can be conducted in scope of claims or a range equivalent to the scope of claims.

EXAMPLES

Hereinafter, the present disclosure is described in more detail by way of examples.

Example 1

A commercially available surface modifier in an amount of 30 μL, was dropped onto a 30-mm-diameter glass substrate, and a thin film was formed by spin coating. This thin film corresponds to thin film 110 shown in FIG. 2A. The surface modifier is a solvent prepared by blending silicon dioxide particles and a polymer material. A volume occupancy of the silicon dioxide particles in the solvent ranges from 1% to 30% (both inclusive). This volume occupancy is a volume occupancy in the solvent before curing.

Plasma etching was performed on the formed thin film with use of an atmospheric plasma device to produce an optical member of Example 1. The optical member of Example 1 is an example of optical member 1 of the first exemplary embodiment. A total plasma etching period was any one of 6, 8, and 10 minutes.

In the thin film of the optical member of Example 1, a volume occupancy of the resin was 3% in a range from a surface of the thin film to a depth ranging from 95 nm to 150 nm (both inclusive).

Figure 7:
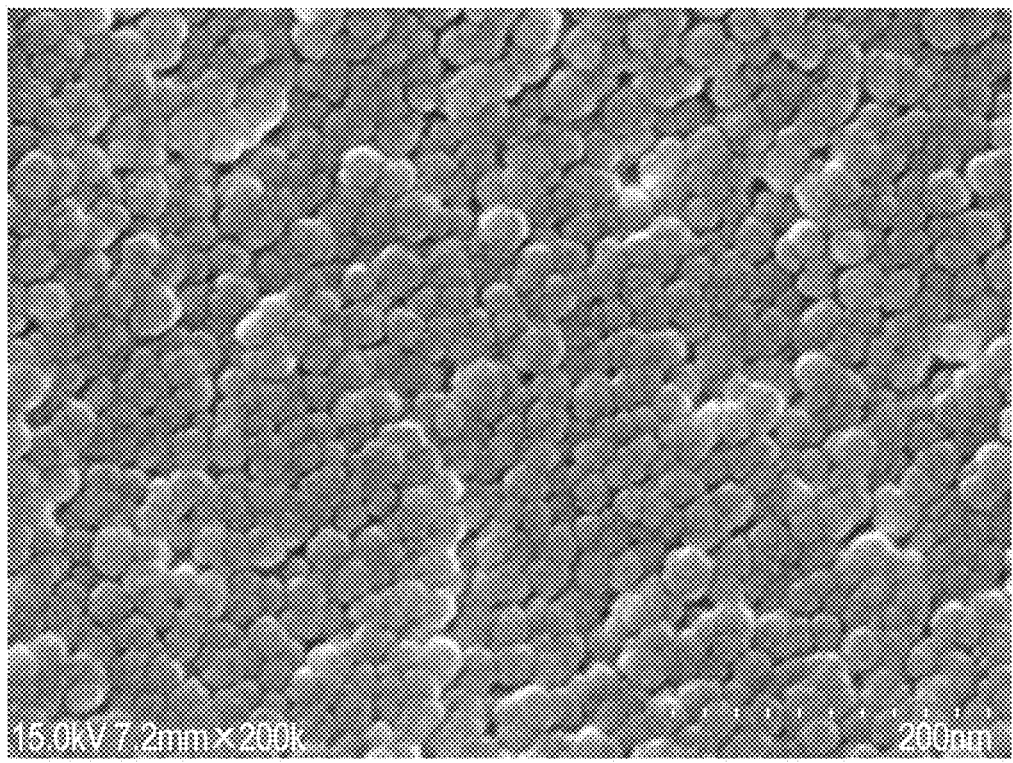
FIG. 7 is a scanning electron micrograph of a surface of an optical member of Example 1.

FIG. 7 is a photograph obtained by imaging a surface of the optical member of Example 1 at a magnification of 200000 times with a scanning electron microscope.

Figure 8:
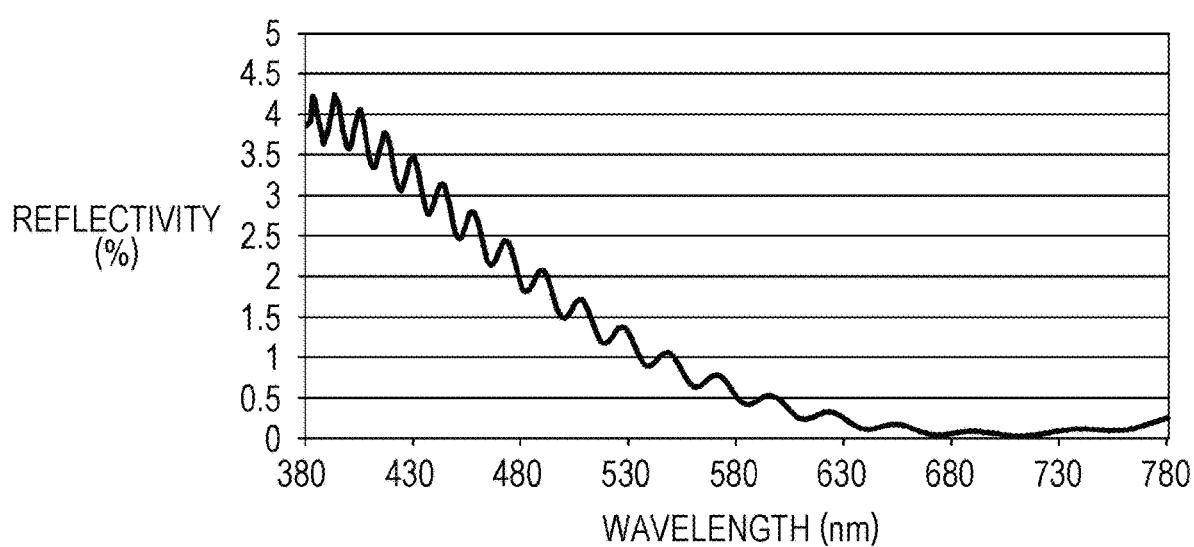
FIG. 8 is a graph showing reflectivity characteristics of the optical member of Example 1.

FIG. 8 is a graph showing reflectivity characteristics of the optical member obtained in Example 1. As shown in FIG. 8, minimum reflectivity of the optical member of Example 1 is 0.2% or less in an optical wavelength region ranging from 630 nm to 780 nm (both inclusive), and reflectivity can be said to be low generally. Accordingly, it is understandable that this optical member is high in the effect of suppressing the reflection.

Figure 9:
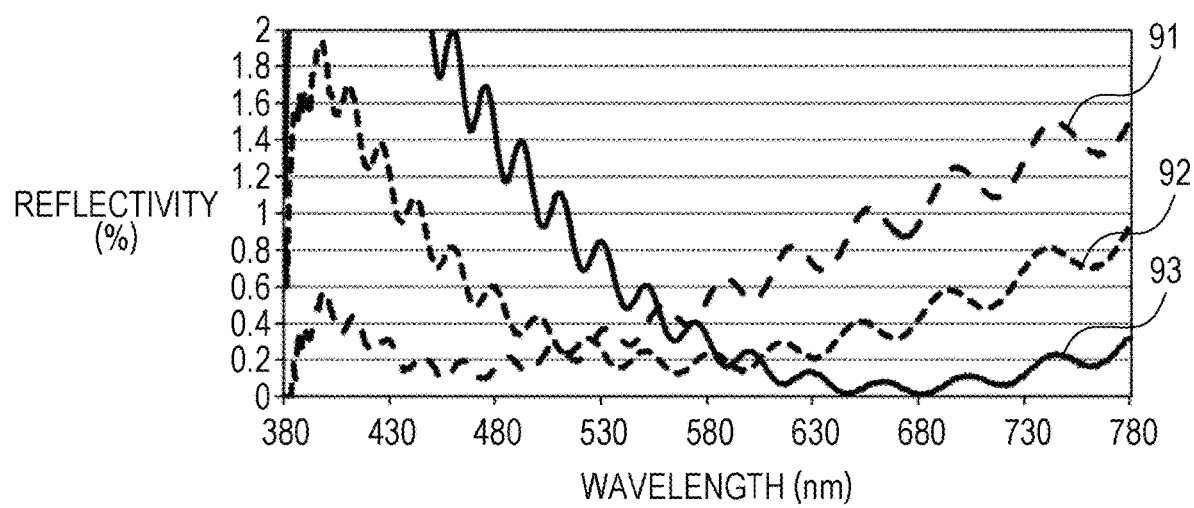
FIG. 9 is a graph showing reflectivity characteristics of the optical member of Example 1 for each total etching period.

FIG. 9 is a graph showing reflectivity characteristics of the optical member for each total etching period. In FIG. 9, the reflectivity characteristics for a total etching period of 6 minutes are indicated by curve 91. The reflectivity characteristics for a total period of 8 minutes are indicated by curve 92. The reflectivity characteristics for a total period of 10 minutes are indicated by curve 93. It is understandable from FIG. 9 that the reflectivity characteristics change according to the total etching period. That is, it is understandable that the total etching period can be adjusted to freely control the reflectivity characteristics.

Example 2

A commercially available surface modifier in an amount of 30 μL, was dropped onto a 30-mm-diameter glass substrate, and a thin film was formed by spin coating. This thin film corresponds to thin film 210 shown in FIG. 6A. The surface modifier is a solvent prepared by blending silicon dioxide particles and a polymer material. A volume occupancy of the silicon dioxide particles in the solvent ranges from 1% to 30% (both inclusive). This volume occupancy is a volume occupancy in the solvent before curing.

A resist material was mounted on a part of a surface of the formed thin film. A region of the thin film on a surface of which the resist material was mounted is referred to as a shielded region. On the other hand, the resist material was not mounted on the other part of the surface of the thin film. Accordingly, the other part of the surface was being exposed. A region of the thin film on a surface of which the resist material was not mounted is referred to as an exposed region. In this state, plasma etching was performed with use of an atmospheric plasma device. The exposed region was etched. The shielded region was not etched. As described above, an optical member of Example 2 was produced. The optical member of Example 2 is an example of optical member 2 of the second exemplary embodiment.

Figure 10:
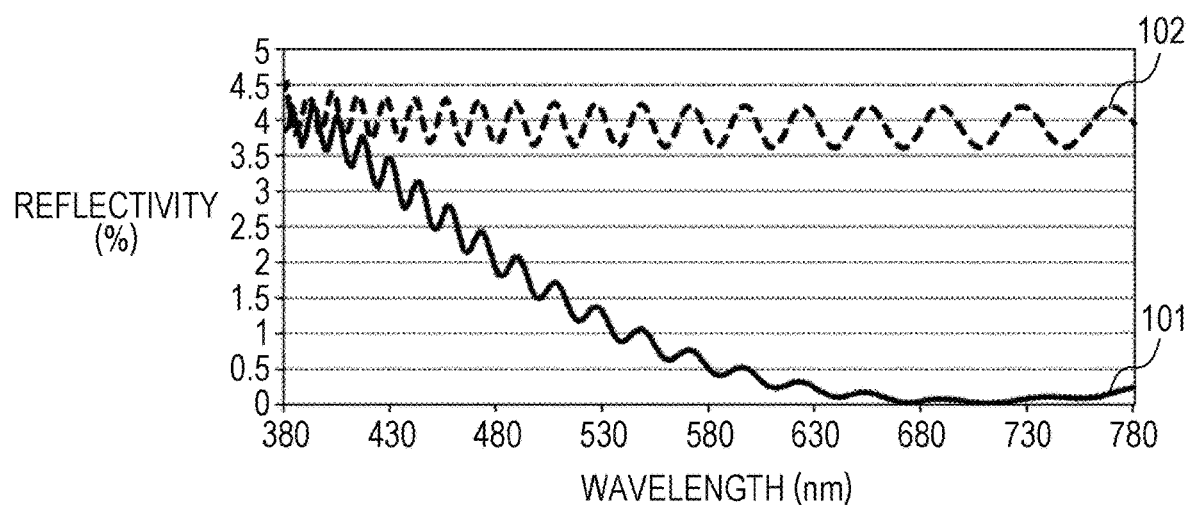
FIG. 10 is a graph showing reflectivity characteristics of an optical member of Example 2.

FIG. 10 is a graph showing reflectivity characteristics of the optical member of Example 2. In FIG. 10, reflectivity characteristics of the region subjected to the etching (etched region) is indicated by curve 101. Reflectivity characteristics of the region not subjected to the etching (unetched region) is indicated by curve 102. The etched region corresponds to first layer 21a and the unetched region corresponds to second layer 21b and third layer 21c in the second exemplary embodiment shown in FIG. 5.

In Example 2, a volume occupancy of the resin was 3% in a range from a surface of the thin film in the etched region to a depth of 155 nm. The volume occupancy of the resin was 48% in a range from a surface of the thin film in the unetched region to a depth of 155 nm.

FIG. 10 shows that minimum reflectivity of the etched region is 0.2% or less in an optical wavelength region ranging from 630 nm to 780 nm (both inclusive). FIG. 10 also shows that minimum reflectivity of the unetched region is about 4% in an optical wavelength region ranging from 630 nm to 780 nm (both inclusive). That is, it is understandable that the minimum reflectivity of the etched region is lower than the minimum reflectivity of the unetched region. Thus, in Example 2, there can be provided the optical member including regions having different reflectivity characteristics in one surface.

Small waviness (amplitude) shown by the curves of the reflectivity characteristics in FIGS. 8 to 10 can be reduced by matching refractive indexes of the substrate and the coating material. Application of the optical member of the present disclosure is not particularly limited, and the optical member can be applied to any optical components. Specifically, the optical member can be applied not only to a lens, but also to a cover plate that covers a lens or a mirror, and a member that needs the suppression of reflectivity in, for example, a display panel. In addition, excellent optical performance can be achieved with use of the optical member on a side of a front surface or a rear surface of, for example, cover glass of a charge coupled device (CCD) image sensor and a complementary metal oxide semiconductor (CMOS) sensor.

The present disclosure can be applied to an optical member such as a lens, a cover plate, a display panel, or a sensor cover glass that is used in, for example, a digital camera, a movie camera, and a mobile phone, and also to a method for manufacturing the optical member.

What is claimed is:

1. An optical member comprising:
  a substrate; and
  a thin film that is disposed on the substrate and contains inorganic particles and a resin,
  wherein the thin film comprises:
  a first layer extending up to at least 60 nm in depth from a surface of at least a part of the thin film opposite from a substrate-end surface of the thin film, wherein, in the first layer, a volume occupancy of the inorganic particles is 10% to 50% and a volume occupancy of the resin is less than 5%; and
  a second layer disposed between the first layer and the substrate, wherein, in the second layer, a volume occupancy of the inorganic particles is 10% to 50% and a volume occupancy of the resin is 40% to 90%.

2. The optical member according to claim 1, wherein an average particle diameter of the inorganic particles ranges from 20 nm to 30 nm (both inclusive).

3. The optical member according to claim 1, wherein the first layer is a front surface layer of the thin film and constitutes an outer surface of the optical member, and the second layer is an inner surface layer of the thin film and is in contact with the substrate.

4. The optical member according to claim 1, wherein the thin film further comprises a third layer.

5. A method for manufacturing an optical member, the method comprising:
  forming a thin film comprising inorganic particles and a resin on a substrate; and
  performing etching on at least a part of the thin film such that the thin film comprises:
  a first layer extending up to at least 60 nm in depth from a surface of at least a part of the thin film opposite from a substrate-end surface of the thin film, wherein, in the first layer, a volume occupancy of the inorganic particles is 10% to 50% and a volume occupancy of the resin is less than 5%, and
  a second layer disposed between the first layer and the substrate, wherein, in the second layer, a volume occupancy of the inorganic particles is 10% to 50% and a volume occupancy of the resin is 40% to 90%.

6. The optical member according to claim 3, wherein the thin film further comprises a third layer.

* * * * *